United States Patent [19]

Lau

[11] Patent Number: 5,895,990
[45] Date of Patent: Apr. 20, 1999

[54] MINIATURE MOTOR

[75] Inventor: James Ching Sik Lau, North Point, The Hong Kong Special Administrative Region of the People's Republic of China

[73] Assignee: Johnson Electric S.A., Switzerland

[21] Appl. No.: 08/889,242

[22] Filed: Jul. 8, 1997

[30] Foreign Application Priority Data

Jul. 10, 1996 [GB] United Kingdom ............ 9614485

[51] Int. Cl.$^6$ ............................................ H02K 13/04
[52] U.S. Cl. ............................ 310/51; 310/220; 310/233; 310/236
[58] Field of Search ...................... 310/221, 220, 310/64, 51, 68 R, 72, 222, 223, 233, 236

[56] References Cited

U.S. PATENT DOCUMENTS

| | | |
|---|---|---|
| 4,983,871 | 1/1991 | Strobl ............... 310/234 |
| 5,008,577 | 4/1991 | Wang ............... 310/233 |
| 5,095,239 | 3/1992 | Wang ............... 310/221 |
| 5,363,005 | 11/1994 | Shitbata et al. ............... 310/244 |
| 5,473,212 | 12/1995 | Crook et al. ............... 310/221 |

FOREIGN PATENT DOCUMENTS

| | | |
|---|---|---|
| 682400 | 11/1995 | European Pat. Off. . |
| 2202686 | 9/1988 | United Kingdom . |

Primary Examiner—Thomas M. Dougherty
Assistant Examiner—Tran Nguyen
Attorney, Agent, or Firm—Ostrolenk, Faber, Gerb & Soffen, LLP

[57] ABSTRACT

A varistor is mounted to a commutator using intermediary springs which are soldered to the terminals of the varistor. The springs engage the tangs of the commutator without soldering to physically and electrically connect the varistor to the commutator.

10 Claims, 3 Drawing Sheets

MINIATURE MOTOR

FIELD OF THE INVENTION

This invention relates to wound rotors for electric motors having a noise suppression element and is particularly concerned with the mounting of the element to the commutator.

PRIOR ART

In miniature electric motors, particularly of the permanent magnet direct current (PMDC) type, it is often desirable to mount a noise suppression element such as a varistor, resistor or capacitor to the commutator to suppress electrical noise and commutation spikes which are generated as the brushes pass from one commutator segment to the next, interrupting the current flowing through an armature coil. Such elements are commonly a ceramic annular disk or ring with surface coatings of solder on one face providing the terminals of the element. The element is connected to the commutator after the windings have been wound and terminated on tangs of the commutator segments. The disk is positioned about the commutator tangs and solder is applied to bridge the gap between the solder pads of the disk and the commutator tangs to electrically connect the segments to the element. The solder also physically supports the disk. The disadvantage of this is that it is very difficult to form a good solder connection across a gap with the solder surfaces arranged at 90° to each other. Also, when making this solder bridge or connection, excess solder and/or solder flux often damages the commutator surface requiring the commutator to be cleaned after the element has been attached.

GB 2202688A discloses a rotor with commutator segments having a flag extending radially from the side of the tangs so that the varistor ring may be soldered directly to the flags which confront the solder pads. Although this is a relatively straightforward procedure, it is not simple and still involves soldering at the commutator requiring the commutator to be cleaned after the varistor ring has been added.

SUMMARY OF THE INVENTION

To overcome these disadvantages, it is proposed to attach the varistor to the commutator in a manner which avoids applying solder to the commutator. This is achieved by the use of an intermediary spring clip.

Accordingly, the present invention provides a rotor for an electric motor comprising a shaft, an armature core mounted on the shaft, armature windings wound around the armature core, a commutator mounted on the shaft adjacent one end of the armature core, the commutator comprising a base supporting a plurality of commutator segments, each segment having a tang connected to a portion of the armature winding, an annular noise suppression element and mounting means for mounting and electrically connecting the noise suppression element to the commutator wherein the mounting means comprises a plurality of spring elements rigidly connected to the noise suppression element and bearing on and co-operating with the tangs of the commutator to resist axial and rotational movement of the noise suppression element with respect to the commutator.

Preferably, the spring element is soldered to terminals of the noise suppression element.

Preferably, the spring element has an axially extending portion which extends through the noise suppression element and overlays the tang and has edge portions arranged to engage sides of the tangs to restrict relative rotational movement.

Preferably, the axially extending portions have a trailing edge arranged to engage the tangs to prevent axial removal of the noise suppression element from the commutator.

According to a second aspect, the present invention provides a method for mounting an annular noise suppression element to a commutator of a rotor for an electric motor, the method comprising stamping a cluster of spring elements from a sheet of conductive spring material, the spring elements being held together by an integral central portion, soldering the spring elements to the terminals of the noise suppression element, removing the central portion of the cluster thereby creating a plurality of individual spring elements soldered to the noise suppression element, sliding the noise suppression element complete with the spring elements onto the commutator so that the spring elements engage tangs of the commutator thereby electrically and physically connecting the noise suppression element to the commutator.

BRIEF DESCRIPTION OF THE FIGURES

Preferred embodiments of the present invention will now be described by way of example only with reference to the accompanying drawings in which.

DETAILED DESCRIPTION OF THE PREFERRED EMBODIMENTS

Figure 1:
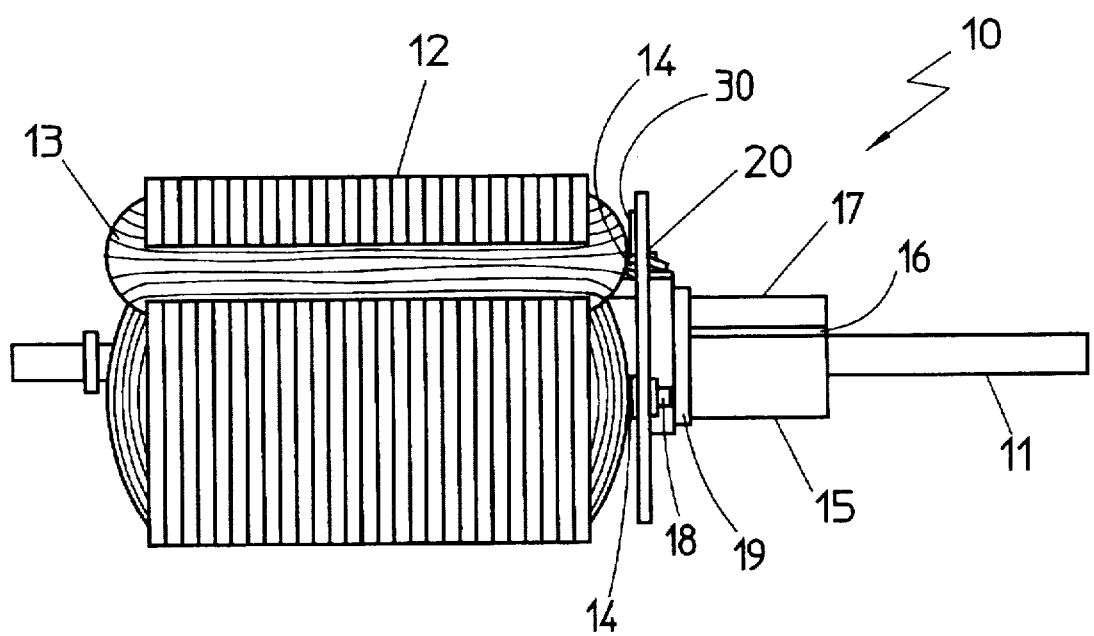
FIG. 1 depicts a wound rotor fitted with a varistor according to a first embodiment of the present invention.

FIG. 1 shows a wound rotor 10 fitted with a varistor 20. The rotor 10 comprises a shaft 11 supporting an armature core 12. Armature windings 13 are wound about the core 12. A commutator 15 is mounted on the shaft 11 adjacent one end of the armature core. The commutator 15 has a base 16 with a plurality of conductive commutator segments 17 disposed on the base 16. Each segment 17 has a terminal or tang 18 for terminating lead wires 14 from the armature windings 13 to electrically connect the armature windings 13 to the commutator segments 17. The commutator segments 17 are fixed on the base by a retaining ring 19.

Figure 4:
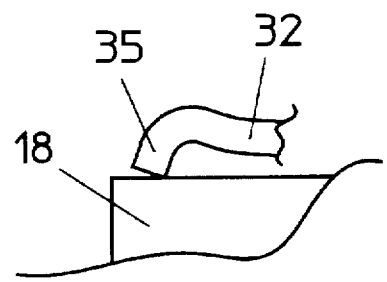
FIG. 4 is a schematic view showing the interconnection between a commutator tang and a spring clip used to connect the varistor to the commutator.

The rotor 10 includes a varistor 20 mounted about the tangs of the commutator by a number of conductive springs 30 which electrically and mechanically connect the varistor to the commutator. The arrangement is more clearly shown in FIGS. 2 and 3. The varistor is a ceramic annular disk having on one surface a number of solder pads 21 forming terminals of the varistor. Conductive springs 30 are soldered to these pads 21. The varistor is then slid onto the commutator to its position about the tangs 18 which have already been connected to the lead wires 14 of the armature windings 13 by usual techniques such as fusing. The free ends 32 of the springs engage with the tangs to locate and electrically connect the varistor with the commutator. The spring clips straddle the tangs and have a cut-out portion 33 which accommodates the raised portion of the tang where the lead wires 14 are connected. This cut-out 33 forms two limbs 34 which extend alongside the tang and prevent or limit rotational movement of the varistor 20 with respect to the commutator 15. The limbs 34 are joined together by a cross member 35 at the free end which bears on the tangs. As shown in FIG. 4, the cross members 35 are arranged to bite into the tangs to resist removal of the varistor. An edge of the crossbar 35 of each spring engages a tang 18 to resist removal and to make a good electrical connection with the commutator. During installation, the limbs 34 bend to slide over the tangs 18 allowing the varistor to be fitted easily.

Figure 2:
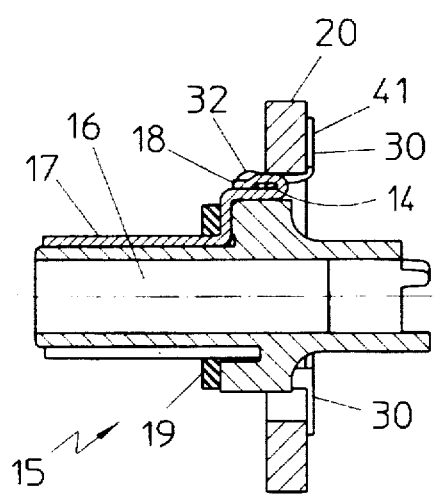
FIG. 2 is a sectional view of the commutator of the rotor of FIG. 1.
Figure 3:
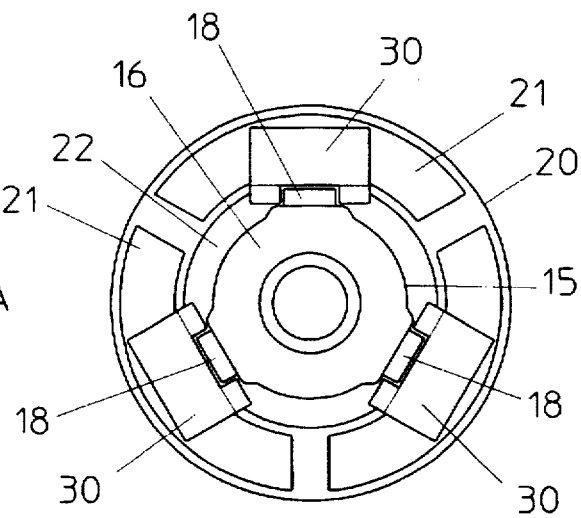
FIG. 3 is an end view of the commutator of FIG. 2 viewed in the direction of arrow A.

As shown in FIGS. 2 and 3, the springs 30 are soldered to the terminal pads 21 of the varistor 20, extend through the hole 22 in the varistor and engage the tangs 18 of the commutator 15. The contact between the tangs and the springs is maintained by the tension of the springs and as the springs are soldered to the varistor before the varistor is fitted to the commutator, there is no contamination of the commutator due to soldering.

Figure 5:
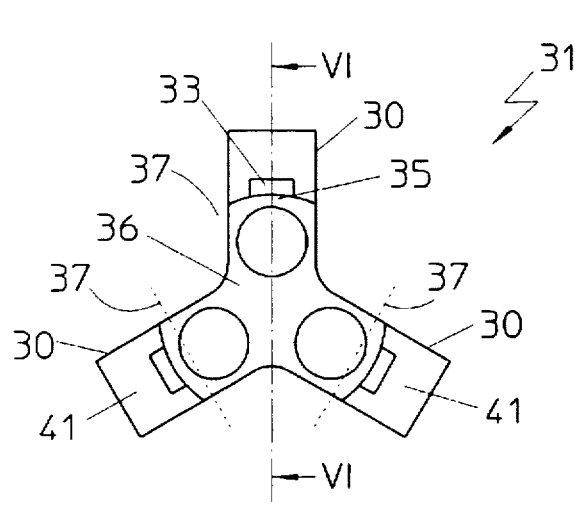
FIG. 5 depicts an intermediary spider used in mounting the varistor of FIG. 1.
Figure 6:
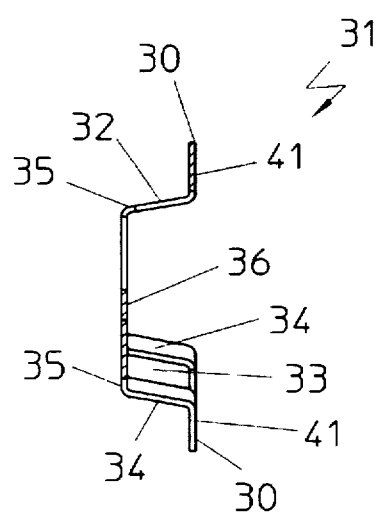
FIG. 6 is a sectional side view of the spider of FIG. 5.

It is considered important for the springs to be evenly spaced about the varistor to avoid introducing an excessive out of balance to the rotor. FIGS. 5 and 6 illustrate one method of achieving this. The springs 30 are stamped from a sheet material in clusters corresponding in number to the number of terminals of the varistor. A three spring version is illustrated. As such, the springs 30 are stamped in clusters in the form of a preliminary spider 31 which fits into the centre of the varistor to allow the springs to be soldered evenly to the terminal pads 21 of the varistor. The spider 31 comprises a central portion 36 with the springs 30 extending generally radially outwardly from the central portion 36. Once the springs of the spider have been soldered to the varistor, the central portion 36 is removed by severing along the cut lines 37 leaving the individual springs 30 soldered to the varistor. The varistor may then be slid onto or otherwise fitted to the commutator.

One disadvantage of the embodiment of FIGS. 1 to 6 is that the terminals of the varistor face the windings and may require an insulation barrier to be placed between the varistor and the armature windings 13 in some applications. An alternative embodiment in which the varistor 20 is mounted facing in the opposite direction is shown in FIGS. 7 to 10.

The springs 30 of the second embodiment do not pass through the centre of the varistor 20 but extend substantially radially. The springs 30 have a first part 41 which is soldered to a varistor terminal pad 21 and from which three fingers 42, 43 extend radially inwardly. The outer fingers 42 extend alongside the commutator tangs 18 to restrict rotational movement of the varistor 20 with respect to the commutator 15 and the middle finger 43 engages the tang and is resiliently deformed to establish electrical contact while providing physical support for the varistor as shown in FIG. 7.

Figure 7:
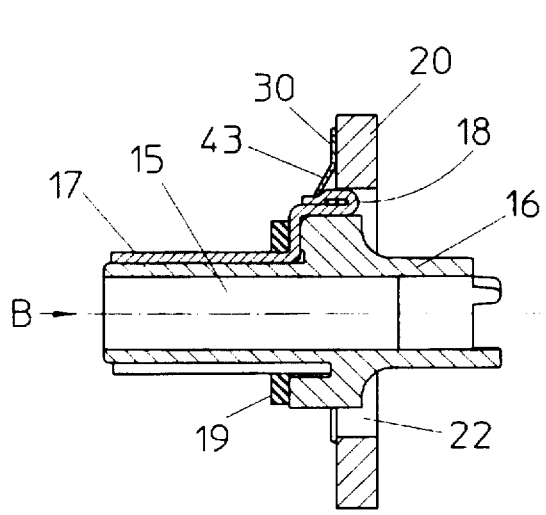
FIG. 7 is a similar view to FIG. 2 of a commutator fitted with a varistor in accordance with a second embodiment of the present invention.
Figure 8:
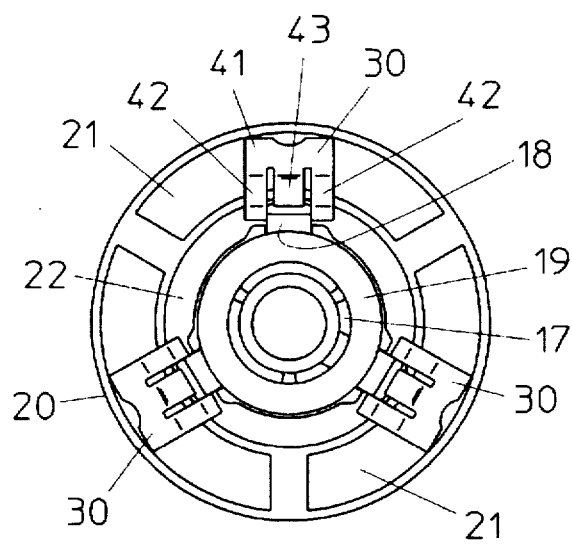
FIG. 8 is an end view of the commutator of FIG. 7 viewed in the direction of arrow B.

FIG. 8 is an end view of the arrangement of FIG. 7 viewed in the direction of arrow B. The three radially inwardly extending fingers 42, 43 are more clearly shown.

Figure 9:
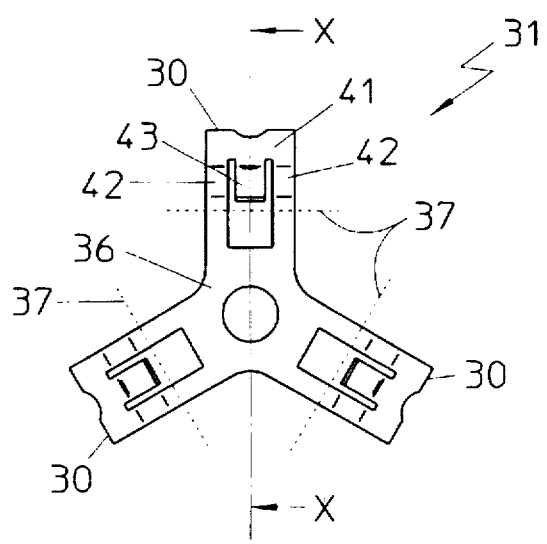
FIG. 9 depicts an intermediary spider used in mounting the varistor of FIG. 7.
Figure 10:
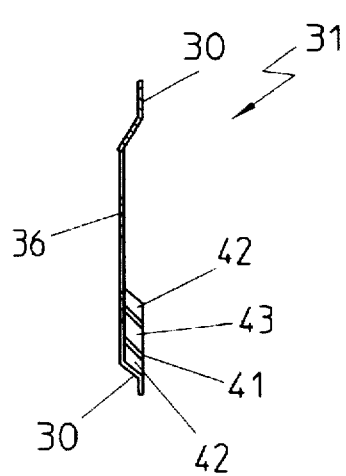
FIG. 10 is a sectional side view of the spider of FIG. 9.

As in the first embodiment, the springs 30 of this embodiment are first stamped from resilient conductive sheet material in clusters forming an intermediate spider 31 as shown in FIGS. 9 and 10 with three springs 30 extending radially from a central portion 36. FIG. 10 is an end view sectioned along X—X of FIG. 9 showing that the spider 31 is slightly dished but otherwise substantially planar. The dish shape allows the varistor 20 to be located about the commutator tangs 18 close to the armature windings 13 while allowing the springs 30 to avoid the lead wires 14 connected to the tangs 18. Once the spider 31 has been soldered to the varistor 20, the central portion 36 is removed by severing along cut lines 37 to leave the individual springs 30 soldered to the varistor 20. The varistor, as before, is then slid onto the commutator tangs with the central fingers 43 engaging the tangs 18 and the outer fingers 42 extending alongside the tangs 18. As the central fingers 43 engage the tangs, they are resiliently deformed to support the varistor and create a locking effect by biting into the surface of the tang thereby resisting removal of the varistor and making electrical contact between the commutator 15 and the varistor 20.

Variations will be obvious to those skilled in the art without departing from the spirit of the invention and it is intended that all such variations be covered by the appended claims.

I claim:

1. A rotor for an electric motor, said rotor comprising:

a shaft;

an armature core fitted to the shaft;

an armature winding wound about the armature core;

a commutator fitted to the shaft adjacent one end of the armature core, the commutator comprising a base supporting a plurality of armature segments, each segment having a tang connected to a portion of the armature winding;

an annular ceramic varistor having a plurality of solder pad type terminals equal in number to the number of segments of the commutator, the varistor being located about the tangs of the commutator; and a plurality of conductive spring elements equal in number to the number of segments of the commutator, each spring element being "E" shaped with three fingers and soldered to a respective terminal of the varistor, the fingers being directed generally radially inwardly of the varistor such that the central finger resiliently bears against and engages a respective tang to make electrical contact between the segment and the varistor and to resist axial movement of the varistor with respect to the commutator and the two outer fingers extending alongside the respective tang in a circumferential sense to resist circumferential movement of the varistor with respect to the commutator.

2. A rotor for an electric motor, said rotor comprising:

a shaft, an armature core mounted on the shaft, an armature winding wound about the armature core, a commutator mounted on the shaft adjacent one end of the armature core, the commutator comprising a base supporting a plurality of commutator segments, each segment having a tang connected to a portion of the armature winding;

an annular noise suppression element; and mounting means for mounting and electrically connecting the noise suppression element to the commutator, the mounting means comprising a plurality of conductive spring elements each connected to the noise suppression element and resiliently bearing and co-operating with the tangs of the commutator to resist axial and rotational movement of the element with respect to the commutator, each spring element having a main portion and three fingers extending from the main portion with one finger resiliently deformed by engagement with a tang of the commutator to establish electrical contact and the other two fingers extending on opposite sides of the tang to prevent relative rotational movement between the commutator and the noise suppression element.

3. A rotor for an electric motor, said rotor comprising:

a shaft, an armature core mounted on the shaft, an armature winding wound about the armature core, a commutator mounted on the shaft adjacent one end of the armature core, the commutator comprising a base supporting a plurality of commutator segments, each segment having a tang connected to a portion of the armature winding;

an annular noise suppression element; and mounting means for mounting and electrically connecting the noise suppression element to the commutator, the mounting means comprising a plurality of conductive spring elements each soldered to terminals of the noise suppression element and resiliently bearing and co-operating with the tangs of the commutator to resist axial and rotational movement of the element with respect to the commutator.

4. A rotor according to claim 3, wherein the spring elements have an axially extending portion which extends through the noise suppression element and overlays the tangs and has edge portions arranged to engage sides of the tangs to restrict relative rotational movement.

5. A rotor as defined in claim 4, wherein the axially extending portions have a trailing edge arranged to engage the tangs to establish electrical contact and to prevent axial removal of the noise suppression element from the commutator.

6. A rotor for an electric motor, said rotor comprising:

a shaft, an armature core mounted on the shaft, an armature winding wound about the armature core, a commutator mounted on the shaft adjacent one end of the armature core, the commutator comprising a base supporting a plurality of commutator segments, each segment having a tang connected to a portion of the armature winding;

an annular noise suppression element; and mounting means for mounting and electrically connecting the noise suppression element to the commutator, the mounting means comprising a plurality of conductive spring elements each connected to the noise suppression element and resiliently bearing and co-operating with the tangs of the commutator to resist axial and rotational movement of the element with respect to the commutator.

7. A rotor as defined in claim 6, wherein the spring elements are soldered to terminals of the noise suppression element.

8. A rotor according to claim 6, wherein the spring elements have an axially extending portion which extends through the noise suppression element and overlays the tangs and has edge portions arranged to engage sides of the tangs to restrict relative rotational movement.

9. A rotor as defined in claim 8, wherein the axially extending portions have a trailing edge arranged to engage the tangs to establish electrical contact and to prevent axial removal of the noise suppression element from the commutator.

10. A rotor as defined in claim 6, wherein each spring element has a main portion and three fingers extending from the main portion with one finger resiliently deformed by engagement with a tang of the commutator to establish electrical contact and the other two fingers extending on opposite sides of the tang to prevent relative rotational movement between the commutator and the noise suppression element.

* * * * *